United States Patent
Rashid et al.

(10) Patent No.: US 9,374,827 B2
(45) Date of Patent: Jun. 21, 2016

(54) LICENSED SHARED ACCESS FOR LONG TERM EVOLUTION

(71) Applicant: Intel Corporation, Santa Clara, CA (US)

(72) Inventors: Mohammad Mamunur Rashid, Hillsboro, OR (US); Rath Vannithamby, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 28 days.

(21) Appl. No.: 14/280,363

(22) Filed: May 16, 2014

(65) Prior Publication Data

US 2015/0334717 A1    Nov. 19, 2015

(51) Int. Cl.
*H04W 72/04*     (2009.01)
*H04W 16/14*     (2009.01)
*H04W 16/02*     (2009.01)

(52) U.S. Cl.
CPC .......... *H04W 72/0493* (2013.01); *H04W 16/02* (2013.01); *H04W 16/14* (2013.01)

(58) Field of Classification Search
CPC .. H04W 72/0493; H04W 16/14; H04W 16/02
See application file for complete search history.

(56) References Cited

U.S. PATENT DOCUMENTS

| | | | | |
|---|---|---|---|---|
| 9,148,792 B2 * | 9/2015 | Arefi | ..................... | H04W 16/14 |
| 2010/0232381 A1 | 9/2010 | Hu | | |
| 2013/0273952 A1 * | 10/2013 | Srikanteswara | ...... | H04W 16/14 |
| | | | | 455/509 |
| 2013/0295948 A1 | 11/2013 | Ye et al. | | |
| 2014/0011509 A1 | 1/2014 | Markwart et al. | | |
| 2014/0256345 A1 * | 9/2014 | Arefi | ..................... | H04W 16/14 |
| | | | | 455/454 |

(Continued)

FOREIGN PATENT DOCUMENTS

WO    WO-2014067550 A1    5/2014

OTHER PUBLICATIONS

"3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12)", 3GPP TS 29.274 V12.1.0, (Jun. 2013), 228 pgs.

(Continued)

*Primary Examiner* — Brian D Nguyen
(74) *Attorney, Agent, or Firm* — Schwegman Lundberg & Woessner, P.A.

(57) ABSTRACT

A proposed 3GPP LTE protocol enhancement disclosed herein, enables an eNB to interface with its network core to achieve optimal resource reallocations and bearer modifications necessary to minimize negative impact on user experience in the events of LSA spectrum reclamation. A method for radio spectrum resource reallocation at an evolved Node B (eNB) comprises acquiring, from an incumbent, Licensed Shared Access (LSA) radio spectrum resource, receiving, from an Operator Administration and Management (OA&M) entity, a directive to relinquish the acquired LSA spectrum resource, performing an analysis of optimal spectrum resource reallocation for determining a proposed reallocation of remaining spectrum resources, communicating, to a network core, the proposed reallocation of remaining spectrum resources, receiving, from the network core, instructions for reallocating the remaining spectrum resources, wherein the instructions are based on the communicated proposal, and reallocating remaining spectrum resources according to the received instructions.

20 Claims, 5 Drawing Sheets

(56) References Cited

U.S. PATENT DOCUMENTS

2014/0321425 A1* 10/2014 Mueck ............... H04W 76/066
 370/331
2015/0181601 A1* 6/2015 Schmidt ............... H04W 12/08
 370/329

OTHER PUBLICATIONS

"3rd Generation Partnership Project; Technical Specification Group Core Network and Terminals; Policy and Charging Control (PCC); Reference points (Release 12)", 3GPP TS 29.212 V12.4.0, (Mar. 2014), 220 pgs.

"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.3.0, (Mar. 2013), 344 pgs.

"3rd Generation Partnership Project; Technical Specification Group Radio Access Network; Evolved Universal Terrestrial Radio Access Network (E-UTRAN); S1 Application Protocol (S1AP) (Release 12)", 3GPP TS 36.413 V12.1.0, (Mar. 2014), 285 pgs.

"Electromagnetic compatibility and Radio spectrum Matters (ERM); System Reference document (SRdoc); Mobile broadband services in the 2 300 MHz-2 400 MHz frequency band under Licensed Shared Access regime", ETSI TR 103 113 V1.1.1, Technical Report, (Jul. 2013), 37 pgs.

"Evolved Universal Terrestrial Radio Access Network (E-UTRAN); S1 Application Protocol (S1AP)", 3GPP TS 36.413 v11.4.0 Technical Specification Group Radio Access Network, Release 11, (Jun. 2013), 274 pgs.

"International Application Serial No. PCT/US2015/025936, International Search Report mailed Jul. 30, 2015", 3pgs.

"International Application Serial No. PCT/US2015/025936, Written Opinion mailed Jul. 30, 2015", 5 pgs.

Khun-Jush, Jamshid, et al., "Licensed shared access as complementary approach to meet spectrum demands: Benefits for next generation cellular systems", ETSI Workshop on Reconfigurable Radio Systems, (Dec. 12, 2012), 7 pgs.

\* cited by examiner

LICENSED SHARED ACCESS FOR LONG TERM EVOLUTION

TECHNICAL FIELD

Examples generally relate to Long Term Evolution (LTE) networks. One or more examples relate to the implementation of Licensed Shared Access (LSA) in LTE networks.

BACKGROUND

Wireless communication systems are widely deployed to provide various types of communication content such as voice, data, and other media. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Currently, there is neither a protocol provided in the 3 GPP LTE standard for eNB resource reallocation due to LSA spectrum release nor a signaling mechanism for eNBs to communicate bearer modification proposals to their EPS-cores. Thus, in order to realize the full benefit of proposed dynamic frequency sharing systems, there is now a need for enhancements to current resource allocation protocol and bearer management signaling in a 3GPP LTE standard.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DESCRIPTION OF EMBODIMENTS

Figure 1:
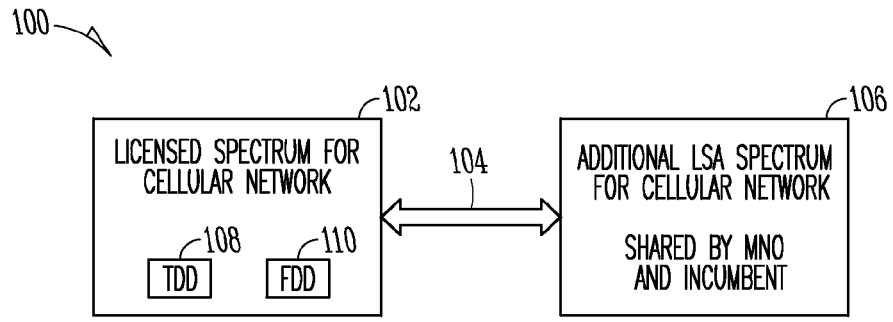
FIG. 1 shows an example of a high level block diagram for dynamic frequency sharing in a cellular network, in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The word "exemplary" is used herein to mean "serving as an example, instance, or illustration." Any embodiment described herein as "exemplary" is not necessarily to be construed as preferred or advantageous over other embodiments.

The terms "communication station", "station", "handheld device", "mobile device", "wireless device" and "User Equipment" (UE) as used herein refers to a wireless communication device such as a cellular telephone, smartphone, tablet, netbook, wireless terminal, laptop computer, a femtocell, High Data Rate (HDR) subscriber station, access point, access terminal, or other personal communication system (PCS) device. The device may be either mobile or stationary.

The term "access point" as used herein may be a fixed station. An access point may also be referred to as an access node, a base station or some other similar terminology known in the art. An access terminal may also be called a mobile station, a user equipment (UE), a wireless communication device or some other similar terminology known in the art.

The terms "relinquish", "release" and "return" are used herein to mean the surrender of LSA spectrum to its incumbent.

Cellular networks, such as LTE, can allow a device to connect to or communicate with other devices. Modern LTE networks can include both large and small cells configured in a Heterogeneous Network (HetNet) configuration. The base stations (e.g., Enhanced Node Bs (eNodeBs)) of large and small cells can be configured to operate on different frequency bands. Frequency bands, i.e. spectrum, adequate for the various types of communication content must be available to a base station for a device to connect to, or communicate with, other devices.

Licensed Shared Access (LSA) can significantly enhance the capacity of 3GPP LTE systems by providing a mechanism to extend available spectrum. A LSA spectrum sharing framework is strongly backed and urgently awaited by major wireless equipment vendors, operators, regulators, government bodies and standardization bodies. In this framework, an incumbent spectrum holder allows coordinated shared access to an unused portion of its licensed spectrum by a group of secondary users (i.e. network operators), such that a large portion of wireless spectrum that otherwise remains unused becomes available to network operators for meeting the ever increasing traffic demand over LTE networks.

However, in order to realize the benefits of sharing unused spectrum, LSA resource management must be implemented in LTE systems design to provide for the acquisition and relinquishment of borrowed spectrum. Especially, when using LSA framework, LTE networks must adapt to the dynamic nature of the available spectrum by efficiently accommodating spectrum reclamations by incumbent spectrum holders.

When an LTE network receives a directive to relinquish (i.e. release) LSA spectrum currently in use, there may be many established bearers that have been admitted with Quality of Service (QoS) parameters and allocated spectrum resources based on the availability of the LSA spectrum. Once the LSA spectrum becomes unavailable, there may be not enough remaining radio resource to maintain the admitted QoS levels of these bearers. In other words, network operators supporting subscribers' requests for applications at QoS levels required by these users using their allocated LSA spectrum are not prepared for the sudden drop in these radio resources when the LSA spectrum is suddenly reclaimed by the incumbent because the resource allocation and bearer management signaling in the current 3GPP LTE specification are defined by a fixed spectrum access model.

There is currently no protocol and signaling mechanism in the 3GPP LTE standard to manage resource reallocation and bearer modifications to accommodate a dynamic spectrum release. Without such mechanisms, the LTE network cannot control the adverse effects on QoS experiences of the users when LSA spectrum reclamation occurs. To accommodate for an upcoming loss of a potentially large portion of the available spectrum resource, an evolved Node B (eNB) must have the ability to perform resource reallocation among these established bearers (i.e. applications currently in use) and determine which bearers' QoS to modify (or release) to optimize usage of the remaining spectrum and to minimize impact on the user experience. The eNB must have the capability to communicate its proposed resource modification to its Evolved Packet System (EPS) core (i.e. network core), which in turn can evaluate these proposals and initiate updates to bearers as necessary.

In some embodiments, the proposed 3GPP LTE protocol enhancement disclosed herein enables the eNB to interface with its EPS-core to achieve optimal resource reallocations and bearer modifications necessary to minimize negative impact on user experience in the events of LSA spectrum reclamation.

FIG. 1 shows an example of a high level block diagram for dynamic LSA frequency sharing in a cellular network. FIG. 1 depicts an example of a system 100 that comprises a legacy band 102 receiving spectrum from or returning spectrum to, at arrow 104, additional LSA spectrum band 106. The legacy band 102 may include a Time Division Duplexing (TDD) band 108 or a Frequency Division Duplexing (FDD) band 110. The additional spectrum from the additional LSA spectrum band 106 may be TDD or FDD bands.

Figure 2:
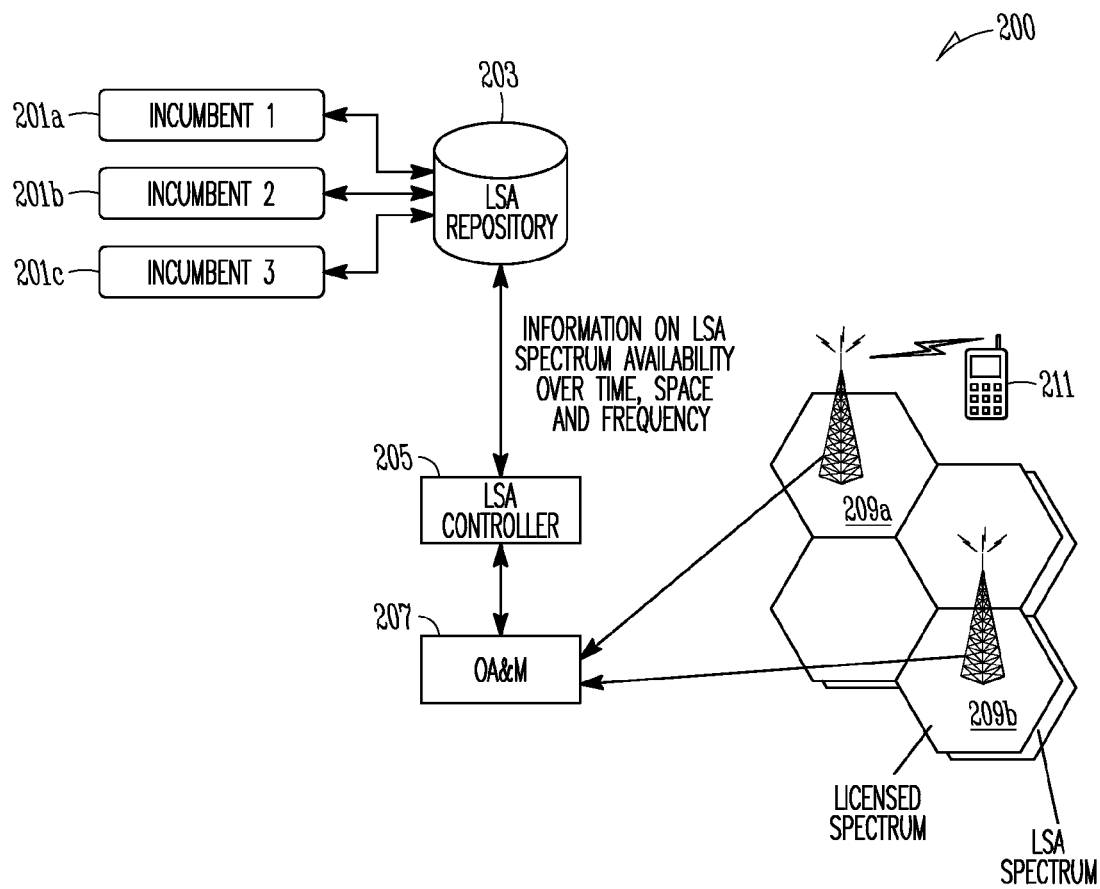
FIG. 2 shows a high level diagram illustrating an exemplary Licensed Shared Access (LSA) system, in accordance with some embodiments.

FIG. 2 shows a high level diagram illustrating an exemplary traditional Licensed Shared Access (LSA) system 200. In a contemporary LSA system, Incumbents 201a-c are original spectrum owners. For Example, Incumbents 201a-c may own Electronic News Gathering (ENG) spectrum from 2.3-2.4 GHz in some European countries. LSA Repository 203 is a data base containing information on spectrum availability of shorter term aspects of spectrum sharing. The LSA Repository 203 is communicatively coupled to LSA controller 205, which performs information management and translates LSA Repository 203 data base contents into spectrum access conditions for LSA licensees, while Operator Administration and Management (OA&M) 207 provides operations, administration, and management for the network operator's network. OA&M manages limited short term additional spectrum for the network operator's eNBs, or base stations, 209a-b serving mobile user 211.

Figure 3:
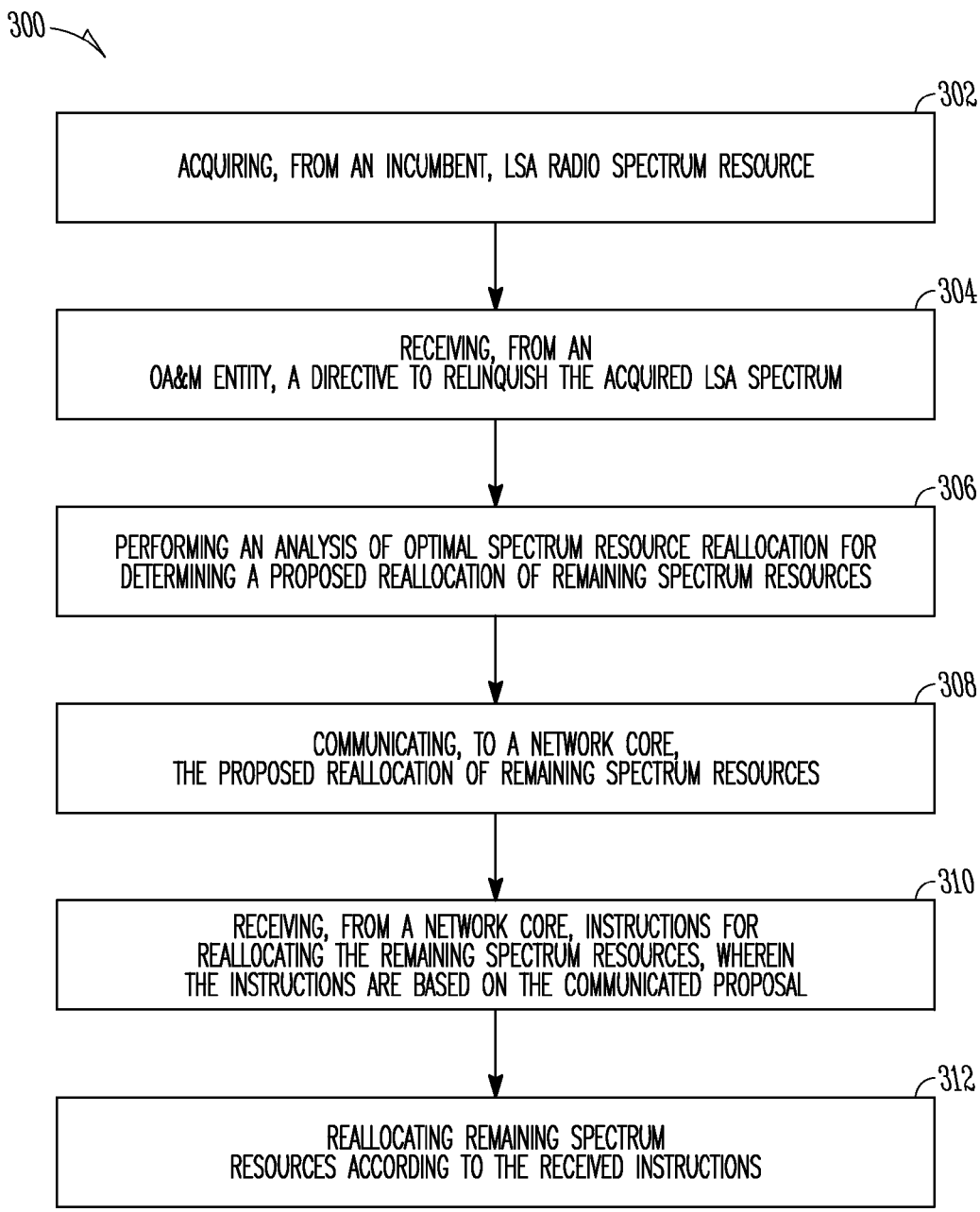
FIG. 3 is a high level overview flow chart illustrating Licensed Shared Access for Long Term Evolution, according to some example embodiments.

FIG. 3 is a high level overview flow chart illustrating Licensed Shared Access for Long Term Evolution 300, according to some example embodiments. Licensed Shared Access for Long Term Evolution provides a robust protocol and signalling mechanism for flexible reallocation of remaining resources among established bearers when the LTE network must comply with an imminent release of LSA spectrum. Traditional 3GPP LTE standards maintain some limited protocols for modifying resources allocated to an established bearer in response to various scenarios including user equipment (UE) or application function (AF) requests, provisioning of new policy and charging control (PCC) rules at a policy and charging rules function (PCRF) entity due to admission of new application/service flows or QoS/charging policy change, detection of some predefined events related to the bearer at the policy and charging enforcement function (PCEF) entity, and UE handover process.

However, none of these scenarios address a directive to an eNB requiring it to relinquish a significant portion of its available spectrum and causing an inability to support its established bearers with their admitted configurations and QoS parameters. Without mechanisms to reallocate the remaining resources and to achieve bearer modifications, there may be uncontrolled detrimental effect on the QoS experiences of many users during LSA spectrum relinquishment. There is currently no known enhancement proposed for the 3GPP LTE specification to include such mechanisms. The disclosed mechanism enables the eNB to perform resource reallocation and request bearer spectrum resource allocation modifications that optimize usage of the remaining spectrum and minimize the effect on QoS experience of users.

For example, an operator may opportunistically use some LTE compatible LSA spectrum resources in the coverage areas of one of more eNBs in its network. These eNBs may utilize the additional LSA spectrum resources to supplement their primary LTE spectrum by employing a Carrier Aggregation (CA) technique. An OA&M entity in the operator's network is responsible for interfacing with the LSA management system, and can receive directives to acquire or relinquish certain LSA spectrum at a specific geographic location. When the OA&M receives a relinquish directive, it will issue a corresponding relinquish command to the eNBs that are currently using the LSA spectrum in the geographic area specified in the directive. An exemplary method for enabling the eNB to interface with its EPS-core to achieve optimal resource reallocations and bearer modifications necessary to minimize negative impact on user experience in the events of LSA spectrum reclamation is detailed in operations 302-312.

In operation 302, an eNB has acquired and utilized LSA spectrum from an incumbent. While the eNB remains in possession of the additional LSA spectrum, there may be no QoS impact on established bearers. Control proceeds to operation 304.

In operation 304, the eNB is directed by an OA&M entity to relinquish the acquired LSA spectrum. In an exemplary embodiment, the OA&M entity informs eNBs that are the serving cells where LSA spectrum must be relinquished. Control proceeds to operation 306.

In operation 306, the eNB performs an analysis of optimal spectrum resource reallocation for determining a proposed reallocation of the spectrum resources, which will remain after LSA spectrum specified by the OA&M has been relinquished. In an exemplary embodiment, the analysis comprises a resource reallocation algorithm for redistributing the remaining spectrum resources. The optimal reallocation minimizes the effect on QoS experience of users, affects the least number of users, and prevents or minimizes bearer hard drops. The eNB executes this resource reallocation algorithm in preparation for the loss of the LSA spectrum identified in the OA&M directive. This algorithm enables the eNB to determine what modifications to existing Radio Access Bearers (RAB) are necessary to optimally utilize the remaining resources after LSA spectrum becomes unavailable. The eNB may determine that some existing RABs may be supported at different QoS levels than their current levels and/or some RABs may not be supportable anymore. Control proceeds to operation 308.

In operation 308, the eNB communicates its proposed bearer modifications for reallocating spectrum resources to its network core. Because eNBs are not directly coupled to the policy and charging control function (PCRF), which is responsible for making decisions on the proposed modification to bearers, the eNB may communicate its proposal to a communicatively coupled Mobility Management Entity (MME) with a list of proposed Enhanced Radio Access Bearer (E-RAB) updates (modifications or deletions). The MME translates the proposed E-RAB updates to EPS bearer resource modifications, and then routs the translated modification message through a serving gateway (S-GW) and packet data network gateway (P-GW) to the policy and charging control function (PCRF) of the network core. The PCRF then evaluates the proposed modifications and returns bearer update commands based on the eNB proposal to the eNB through the P-GW, S-GW and MME respectively causing the MME to process E-RAB modifications as necessary. The PCRF may also signal the application Function (AF) regarding impending QoS impacts in order to allow applications associated with modified bearers to adapt accordingly. Control proceeds to operation 310.

In operation 310, the eNB receives instructions for reallocating the remaining spectrum resources from network core PCRF entity, which are based on the proposal communicated in operation 308. Control proceeds to operation 312. In operation 312, the eNB reallocated the remaining spectrum resources according to the instruction received in operation 310. These messaging procedures are next detailed in FIG. 4.

Figure 4:
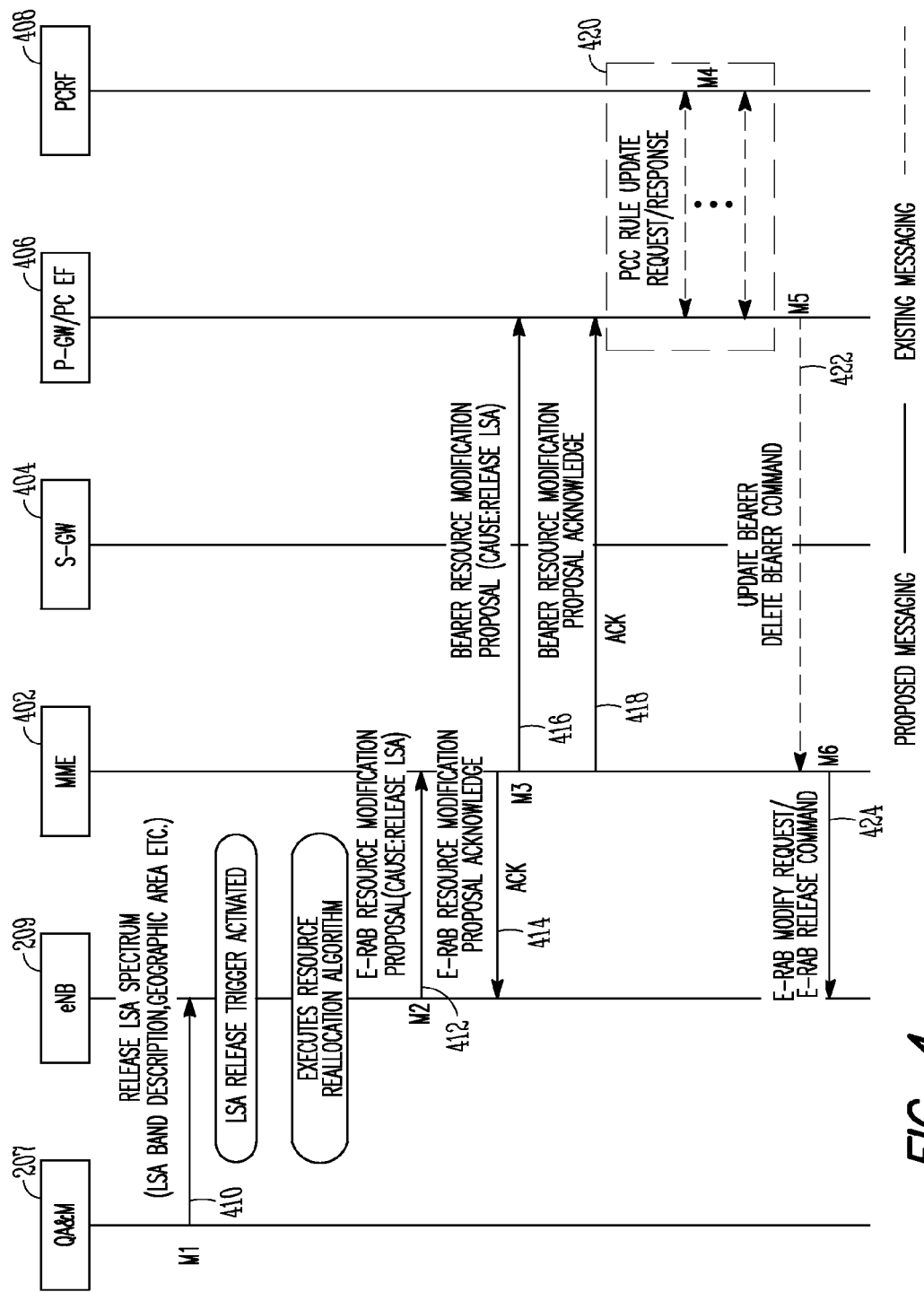
FIG. 4 illustrates an exemplary procedure for Licensed Shared Access for Long Term Evolution, according to some embodiments.

FIG. 4 depicts a messaging procedure diagram of a signaling and messaging mechanism for achieving resource reallocation and bearer modifications/reconfigurations in response to an impending loss of relinquished LSA spectrum resources. An OA&M directive to relinquish LSA band spectrum generates a trigger in the eNB causing execution of spectrum resource reallocation among the established bearers in a manner that optimizes usage of remaining radio spectrum resources and minimizes negative QoS experience impact on users. The eNB is triggered to perform an analysis of optimal spectrum resource reallocation for determining a proposed reallocation of remaining spectrum resources and communicate bearer modification proposals based on the outcome of its resource reallocation analysis algorithm so that the network core can evaluate and respond with appropriate bearer update or deletion procedure(s). Protocol and messaging enhancements to the 3GPP specifications detail a mechanism for achieving resource reallocation and bearer modifications when an eNB is directed to release LSA spectrum in use.

As illustrated in FIG. 4, eNB (or base station) 209 may be arranged to receive a message M1 410 from OA&M 207 carrying a directive to relinquish LSA spectrum. Message M1 410 may carry a management frame and/or parameters comprising LSA band descriptive information such as geographic area, etc. identifying the LSA spectrum to be relinquished. Message M1 410 generates an LSA relinquishment (i.e. release) trigger at eNB 209 causing execution of a resource reallocation algorithm. The resource reallocation algorithm, which can be vendor-specific, determines what modifications to existing Eutran-Radio Access Bearers (E-RABs) are necessary to optimally utilize the remaining resources after LSA spectrum becomes unavailable. The eNB may determine that some existing E-RABs could be supported at different QoS levels than their current levels and/or some E-RABs may no longer be supportable at all.

The eNB 209 may be arranged to then transmit Message M2 412 to MMEs 402 associated with these E-RABs carrying proposals for E-RAB modifications and/or deletions. Message M2 412 may comprise a S1AP message structure as defined in 3GPP 36.413 3GPPTS36.413V11.4.0 (2013-06), "3$^{rd}$ Generation Partnership Project; Technical Specification Group Radio Access Network; Access Network (E-UTRAN); S1 Application Protocol (S1AP)(Release11)", namely S1AP Message: E-RAB Resource Modification Proposal. Message M2 412 is transmitted by eNB 209 to MME 402 to propose E-RAB modifications for multiple UEs 211 simultaneously in response to predefined triggers that necessitate resource reallocation and bearer modifications. Message M2 412 structure is defined below in Table 1.

TABLE 1

| IE/Group Name | Presence | Range | IE type and reference | Semantics description | Criticality | Assigned Criticality |
|---|---|---|---|---|---|---|
| Message Type | M | | 9.2.1.1 | | YES | reject |
| Procedure Reference Id | M | | OCTET STRING (8) | | YES | reject |
| Cause | M | | Cause | | YES | reject |
| Proposed UE E-RAB to Be Modified IEs | | 1 ... <maxnoofUEs> | | | EACH | reject |
| MME UE S1AP ID | M | | 9.2.3.3 | | YES | reject |
| eNB UE S1AP ID | M | | 9.2.3.4 | | YES | reject |
| UE Aggregate Maximum Bit Rate | O | | 9.2.1.20 | | YES | reject |
| Proposed UE-specific E-RAB to Be Modified List | | 1 | | | | |
| Proposed UE-specific E-RAB to Be Modified IEs | | 1 ... <maxnoofE-RABs> | | | | |
| E-RAB ID | M | | 9.2.1.2 | | — | |
| E-RAB Level QoS Parameters | M | | 9.2.1.15 | Includes proposed QoS parameters. | — | |
| Proposed UE-specific E-RAB to Removed List | | 1 | | | | |
| Proposed UE-specific E-RAB to Be Removed IEs | | 1 ... <maxnoofE-RABs> | | | | |
| E-RAB ID | M | | 9.2.1.2 | | — | |

MME 402 may respond with ACK 414 containing a Request Reference Identification (ID). If the MME 402 is unable to process or take action based on the request, it will indicate it in a cause field of the acknowledgement. ACK 414 may comprise a S1AP message structure, S1AP Message: namely E-RAB Resource Modification Proposal Acknowledge, transmitted by MME 402 to eNB 209 to acknowledge reception of the E-RAB Resource Modification Proposal message M1 410. ACK 414 message structure is defined below in Table 2.

TABLE 2

| IE/Group Name | Presence | Range | IE type and reference | Semantics description | Criticality | Assigned Criticality |
|---|---|---|---|---|---|---|
| Message Type | M | | 9.2.1.1 | | YES | reject |
| Procedure Reference Id | M | | OCTET STRING (8) | | YES | reject |
| Cause | O | | Cause | | YES | reject |

The MME 402 uses one-to-one mapping information between E-RABs and EPS bearers to determine the implications of the proposed E-RAB modifications to those at the EPS bearer level. Based on the outcome, the MME 402 then be arranged to transmit Message M3 416 carrying EPS bearer resource modification proposals to Service Gateway (S-GW) 404. Message M3 416 is in turn forwarded to appropriate P-GW/PCEFs 406 by the S-GW 404. Message M3 416 may comprise a GTPv2-c message structure (3GPP 29.274 [4]): GTPv2-c Message: Bearer Resource Modification Proposal defined below in Table 3.

TABLE 3

| Information elements | P | Condition/Comment | IE Type | Ins. |
|---|---|---|---|---|
| Procedure Reference Id | M | This IE provides an identity for this request so that any later message related to this request can refer to it | PTI | 0 |
| Cause | M | This IE shall indicate the reason for the bearer modification proposals | Cause | 0 |
| Bearer Contexts Proposed for Modifications | C | Several IEs with the same type and instance value may be included as necessary to represent a list of Bearers proposed to be modified. | Bearer Context | 0 |
| Bearer Contexts Proposed for Deletion | C | Several IEs with the same type and instance value may be included as necessary to represent a list of Bearers to be deleted | Bearer Context | 0 |

After the P-GW/PCEF 406 receives the Bearer Resource Modification Proposal message M3 416, it translates the proposed modifications to necessary PCC rule updates. PGW/PCEF 406 may respond by transmitting an acknowledgement message ACK 418 to the MME 402 via S-GW 404, indicating that the proposal has been received and is being processed. If the request cannot be processed or if it is rejected, the reason is included in a cause field of ACK 418. ACK 418 may comprise an acknowledgement GTPv2-c Message: Bearer Resource Modification Proposal Acknowledge defined below in Table 3.

TABLE 3

| Information elements | P | Condition/Comment | IE Type | Ins. |
|---|---|---|---|---|
| Procedure Reference ID | M | This IE refers to the identity of the Bearer Resource Modification Proposal request that is being acknowledged | PTI | 0 |
| Cause | O | The IE refers to the cause if the Bearer Resource Modification Proposal message is rejected or cannot be processed | Cause | 0 |

In addition to transmitting ACK 418, the PCEF 406 may also then be arranged to communicate message M4 420 carrying the translated PCC rule update requests via a Gx interface to PCRF 408 according to the procedure defined in section 4.5.1 of 3GPP 29.212, 3GPP TS 29.212 V12.4.0 (2014-03), "3$^{rd}$ Generation Partnership Project; Technical Specification Group Core Network and Terminals; Policy and Charging Control (PCC); Reference points (Release12)". Message M4 may comprise a novel Event-Trigger-Avp value specific to LSA communicated with these rule update requests such that PCRF 408 may consult LSA related policies when evaluating the request messages M4 420. The novel Event-Trigger-Avp value may be included in the list of values defined in Section 5.3.7 of 3GPP 29.212: LSA_RELEASE_INDICATION (46). When used in a Credit Control Request (CCR) command, this Event-Trigger-Avp value indicates that this PCEF 406 generated PCC rule update request is related to a resource availability change due to return of some LSA spectrum to its incumbent.

The PCRF 408 provisions modified PCC rules to the PCEF 406 in response to these update requests. Based on the newly provisioned rules reflecting the loss of spectrum resource, the PCEF 406 then initiates bearer update and/or deletion procedures using the Update Bearer Request and/or Delete Bearer Request messages as described in sections 7.2.15 and 7.2.9.2 respectively of 3GPP 29.274, 3GPPTS 29.274V12.1.0 (2013-06), "3$^{rd}$ Generation Partnership Project; Technical Specification Group Core Network and Terminals; 3GPP Evolved Packet System (EPS) Evolved General Packet Radio Service (GPRS) Tunneling Protocol for Control plane (GTPv2-C); Stage3 (Release12)". In communications M4 420, the PCEF 408 includes a Procedure Reference ID of Bearer Resource Modification Proposal message M3 416 that was transmitted by the MME 402. Thus, the MME 402 correlates M5 422 response messages from P-GW/PCEF 406 messages with the earlier transmitted request M3 416. For correlation purposes, GTPv2-C Update and Delete Bearer Request messages may comprise a novel Procedure Reference Id field of type PTI.

The MME 402 subsequently transmits message M6 424 carrying appropriate E-RAB modify request/E-RAB release commands to the eNB 209 instructing it to modify its corresponding E-RABs. To enable the eNB 209 correlate these commands with the E-RAB Resource Modification Proposal message M2 412 transmitted earlier by eNB 209, the MME 403 may include the Procedure Reference ID in the E-RAB Modify Request, and E-RAB Release commands M6 424 in a novel Procedure Reference ID field in these S1AP messages. The eNB 209 then takes appropriate steps to modify the corresponding data radio bearers (DRBs) at the Radio Resource Command (RRC) level.

Figure 5:
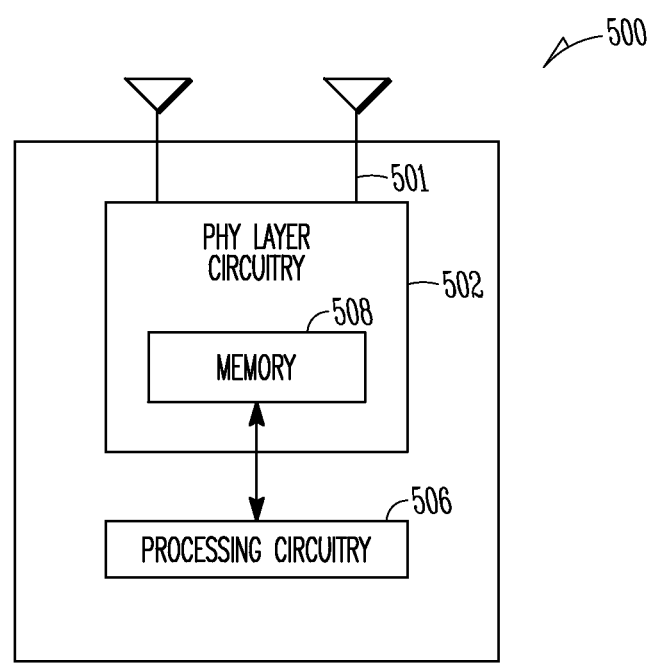
FIG. 5 shows a functional diagram of an exemplary communication station in accordance with some embodiments.

FIG. 5 shows a functional diagram of an exemplary communication station in accordance with some embodiments. In one embodiment, FIG. 5 illustrates a functional block diagram of a Base Station 209 or UE 211 (FIG. 2) in accordance with some embodiments. Communication station 500 may also be suitable for use as a handheld device, mobile device, a cellular telephone, smartphone, tablet, netbook, wireless terminal, laptop computer, a femtocell, High Data Rate (HDR) subscriber station, access point, access terminal, or other personal communication system (PCS) device.

The communication station 500 may include physical layer circuitry 502 for transmitting and receiving signals to and from other communication stations using one or more antennas 501. The communication station 500 may also include medium access control layer (MAC) circuitry 504 for controlling access to the wireless medium. Communication Station 500 may also include processing circuitry 506 and memory 508 arranged to perform the operations described herein. In some embodiments, the physical layer circuitry 502 and the processing circuitry 504 may be configured to perform operations detailed in FIGS. 3 and 4.

In accordance with some embodiments, the MAC circuitry 504 may be arranged to contend for a wireless medium configure frames or packets for communicating over the wireless medium and the PHY circuitry 502 may be arranged to transmit and receive signals. The PHY circuitry 502 may include circuitry for modulation/demodulation, upconversion/downconversion, filtering, amplification, etc. In some embodiments, the processing circuitry 504 of the communication station 500 may include one or more processors. In some embodiments, two or more antennas 501 may be coupled to the physical layer circuitry 502 arranged for sending and receiving signals. The memory 508 may store information for configuring the processing circuitry 506 to perform operations for configuring and transmitting message frames and performing the various operations described herein.

In some embodiments, the communication station 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly.

In some embodiments, the communication station 500 may include one or more antennas 501. The antennas 501 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated to take advantage of spatial diversity and the different channel characteristics that may result between each of antennas and the antennas of a transmitting station.

In some embodiments, the communication station 500 may include one or more of a keyboard, a display, a non-volatile memory port, multiple antennas, a graphics processor, an application processor, speakers, and other mobile device elements. The display may be an LCD screen including a touch screen.

Although communication station 500 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 500 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory memory mechanism 508 for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station STA 400 may include one or more processors and may be configured with instructions stored on a computer-readable storage device memory 508.

Figure 6:
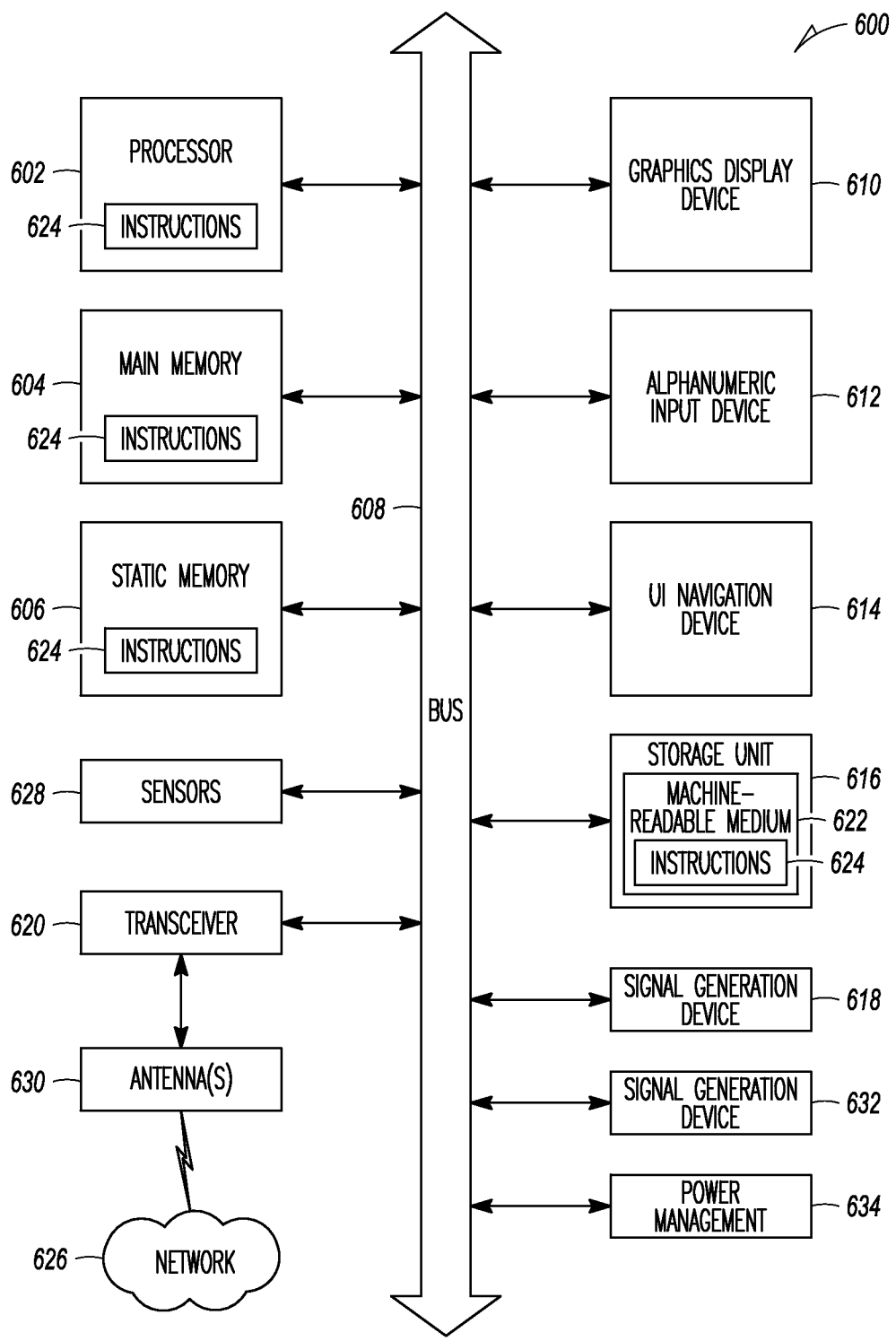
FIG. 6 shows a block diagram of an example of a machine upon which, any of one or more techniques (e.g., methods) discussed herein may be performed.

FIG. 6 illustrates a block diagram of another example machine 600 upon which any one or more of the techniques (e.g., methodologies) discussed herein may performed. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, input device 66 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.)

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having resting mass. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

As used herein, a HetNet may be a cellular network system (e.g., 3GPP system) using multiple different cell types, such as macro, micro, femto, or pico cells. Some or all of the applied cell types may or may not be (partially or fully) overlapping in time, space, or frequency. A HetNet may also be a cellular network combined with other non-cellular technology networks such as WiFi (IEEE 802.11a/b/g/n/ac/ad), WiFi for TVWS (IEEE 802.11af), mmWave systems, or the like. Some or all of the coverage areas or cells of the technologies in the HetNet may or may not be (partially or fully) overlapping in time, space, or frequency.

Wired communications may include serial and parallel wired mediums, such as Ethernet, Universal Serial Bus (USB), Firewire, Digital Visual Interface (DVI), High-Definition Multimedia Interface (HDMI), etc. Wireless communications may include, for example, close-proximity wireless mediums (e.g., Radio Frequency (RF), such as based on the Near Field Communications (NFC) standard, InfraRed (IR), Optical Character Recognition (OCR), magnetic character sensing, or the like), short-range wireless mediums (e.g., Bluetooth, WLAN, Wi-Fi, etc.), long range wireless mediums (e.g., cellular wide area radio communication technology that may include, for example, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g., UMTS (Universal Mobile Telecommunications System), FOMA (Freedom of Multimedia Access), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA UMTS (Wideband Code Division Multiple Access Universal Mobile Telecommunications System), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System-Time-Division Duplex), TD-CDMA (Time Division-Code Division Multiple Access), TD-CDMA (Time Division-Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13) and subsequent Releases (such as Rel. 14, Rel. 15, etc.), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard), electronic interaction via sound waves, IEEE 802.11a/b/g/n/ac/ad/af, WiFi, WiFi for TVWS, IEEE 802.16e/m, WiMAX, or the like.

In one embodiment, a method for radio spectrum resource reallocation at an evolved Node B (eNB) comprises acquiring, from an incumbent, Licensed Shared Access (LSA) radio spectrum resource, receiving, from an Operator Administration and Management (OA&M) entity, a directive to relinquish the acquired LSA spectrum resource, performing an analysis of optimal spectrum resource reallocation for determining a proposed reallocation of remaining spectrum resources, communicating, to a network core, the proposed reallocation of remaining spectrum resources, receiving, from the network core, instructions for reallocating the remaining spectrum resources, wherein the instructions are based on the communicated proposal, and reallocating remaining spectrum resources according to the received instructions.

In another embodiment, a communication station is arranged to perform radio spectrum resource reallocation, the communication station comprising physical layer circuitry and processing elements to receive, a message M1 carrying a management frame and/or parameters comprising LSA band descriptive information identifying Licensed Shared Access (LSA) spectrum to be relinquished, wherein the message M1 triggers execution of a resource reallocation algorithm, transmit to a Mobility Management Entity (MME), a message M2, carrying a bearer resource modification proposal determined by the resource reallocation algorithm, and receive, from the MME a message M6, carrying Enhanced Radios Access Bearer (E-RAB) update commands for reallocating reaming spectrum resources.

In yet another embodiment, a non-transitory computer readable storage device including instructions stored thereon, the instructions, which when executed by a machine, cause the machine to perform operations comprising acquiring, from an incumbent, Licensed Shared Access (LSA) radio spectrum resource, receiving, from an Operator Administration and Management (OA&M) entity, a directive to relinquish the acquired LSA spectrum resource, performing an analysis of optimal spectrum resource reallocation for determining a proposed reallocation of remaining spectrum resources, communicating, to a network core, the proposed reallocation of remaining spectrum resources, receiving, from the network core, instructions for reallocating the remaining spectrum resources, wherein the instructions are based on the communicated proposal, and reallocating remaining spectrum resources according to the received instructions.

ADDITIONAL NOTES

The above Description of Embodiments includes references to the accompanying drawings, which form a part of the detailed description. The drawings show, by way of illustration, specific embodiments in which methods, apparatuses, and systems discussed herein may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

The flowchart and block diagrams in the FIGS. illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The functions or techniques described herein may be implemented in software or a combination of software and human implemented procedures. The software may consist of computer executable instructions stored on computer readable media such as memory or other type of storage devices. The term "computer readable media" is also used to represent any means by which the computer readable instructions may be received by the computer, such as by different forms of wired or wireless transmissions. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

As used herein, a "-" (dash) used when referring to a reference number means "or", in the non-exclusive sense discussed in the previous paragraph, of all elements within the range indicated by the dash. For example, 103A-B means a nonexclusive "or" of the elements in the range {103A, 103B}, such that 103A-103B includes "103A but not 103B", "103B but not 103A", and "103A and 103B".

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Description of Embodiments, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Description of Embodiments as examples or embodiments, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

What is claimed is:

1. A method for radio spectrum resource reallocation at an evolved Node B (eNB), the method comprising:
   acquiring, from an incumbent, Licensed Shared Access (LSA) radio spectrum resource;
   receiving, from an Operator Administration and Management (OA&M) entity, a directive to relinquish the acquired LSA spectrum resource;
   performing an analysis of optimal spectrum resource reallocation for determining a proposed reallocation of remaining spectrum resources, the remaining spectrum sources comprising spectrum resources remaining after relinquishing the acquired LSA spectrum resource;
   communicating, to a network core, the proposed reallocation of the remaining spectrum resources;
   receiving, from the network core, instructions for reallocating the remaining spectrum resources, wherein the instructions are based on the communicated proposal; and
   reallocating remaining spectrum resources according to the received instructions.

2. The method of claim 1, wherein the OA&M directive to relinquish LSA band spectrum generates a trigger in the eNB causing execution of a resource reallocation algorithm for spectrum resource reallocation among established bearers in a manner that optimizes usage of the remaining spectrum resources and minimizes negative Quality of Service (QoS) experience impact on users.

3. The method of claim 1, wherein communicating the proposed reallocation of remaining spectrum resources further comprises communicating bearer modification proposals based on an outcome of a resource reallocation analysis algorithm so that the network core can evaluate and respond with appropriate bearer update or deletion procedure(s).

4. The method of claim 1, wherein the eNB communicates the proposed reallocation of the remaining spectrum resources to the network core via a communicatively coupled Mobility Management Entity (MME) with a list of proposed Enhanced Radio Access Bearer (E-RAB) modifications or deletions.

5. The method of claim 1, wherein a Mobility Management Entity (MME) communicatively coupled to the eNB translates proposed Enhanced Radio Access Bearer (E-RAB) updates to Evolved Packet System (EPS) bearer resource modifications, and then routs a translated modification message through a serving gateway (S-GW) and a packet data network gateway (P-GW) to a policy and charging control function (PCRF) of the network core, and wherein the PCRF then evaluates proposed modifications and returns bearer update commands based on an eNB proposal to the eNB through the P-GW, S-GW and MME respectively, causing the MME to process E-RAB modifications as necessary.

6. The method of claim 1, wherein the directive to relinquish the acquired LSA spectrum resource comprises LSA band descriptive information comprising a geographic area identifying the LSA spectrum resource to be relinquished.

7. The method of claim 1, wherein performing an analysis of optimal spectrum resource reallocation for determining a proposed reallocation of the remaining spectrum resources further comprises executing a vendor specific resource reallocation algorithm.

8. A communication station arranged to perform radio spectrum resource reallocation, the communication station comprising physical layer circuitry and processing elements to:
   receive, a message M1 carrying a management frame and/or parameters comprising Licensed Shared Access (LSA) band descriptive information identifying LSA spectrum to be relinquished, wherein the message M1 triggers execution of a resource reallocation algorithm;

transmit to a Mobility Management Entity (MME), a message M2, carrying a bearer resource modification proposal determined by the resource reallocation algorithm; and receive, from the MME a message M6, carrying Enhanced Radios Access Bearer (E-RAB) update commands for reallocating remaining spectrum resources, the remaining spectrum resources comprising spectrum resources remaining after relinquishing the identified LSA spectrum resource.

9. The communication station of claim 8 further arranged to receive the message M6 carrying the E-RAB update commands for reallocating the remaining spectrum resources from the MME via a Service Gateway (S-GW) communicatively coupled to a packet data network gateway/policy and charging enhancement function (P-GW/PCEF), in turn communicatively coupled to a policy and charging rules function (PCRF), which creates rule updates that are translated to the E-RAB update commands by the P-GW/PCEF.

10. The communication station of claim 8 wherein the message M2 comprises a S1AP message structure as defined in 3GPP 36.413 3GPPTS36.413V11.4.0 (2013-06), "$3^{rd}$GenerationPartnershipProject; Technical Specification Group Radio Access Network; Access Network(E-UTRAN); S1 Application Protocol (S1AP)(Release11)," namely an S1AP Message: E-RAB Resource Modification Proposal.

11. The communication station of claim 8 further arranged to receive, in response to message M2, an Acknowledgement message carrying a Request Reference Identification, wherein the Acknowledgement message is an S1 Application Protocol structured message: E-RAB Resource Modification Proposal Acknowledge.

12. The communication station of claim 8 wherein the message M6 carrying Enhanced Radios Access Bearer (E-RAB) update commands for reallocating remaining spectrum resources comprises an S1 Application Protocol message having a Procedure Reference ID.

13. The communication station of claim 8 wherein the communication station is an evolved Node B (eNB).

14. A non-transitory computer readable storage device including instructions stored thereon, the instructions, which when executed by a machine, cause the machine to perform operations comprising:

acquire, from an incumbent, Licensed Shared Access (LSA) radio spectrum resource;

receive, from an Operator Administration and Management (OA&M) entity, a directive to relinquish the acquired LSA spectrum resource;

perform an analysis of optimal spectrum resource reallocation for determining a proposed reallocation of remaining spectrum resources, the remaining spectrum resources comprising spectrum resources remaining after relinquishing the acquired LSA spectrum resource;

communicate, to a network core, the proposed reallocation of the remaining spectrum resources;

receive, from the network core, instructions for reallocating the remaining spectrum resources, wherein the instructions are based on the proposed reallocation of the remaining spectrum resources; and reallocate the remaining spectrum resources according to the received instructions.

15. The non-transitory computer readable storage device of claim 14, wherein the OA&M directive to relinquish the LSA spectrum resource generates a trigger causing execution of a resource reallocation algorithm for spectrum resource reallocation among established bearers in a manner that optimizes usage of the remaining spectrum resources and minimizes negative Quality of Service (QoS) experience impact on users.

16. The non-transitory computer readable storage device of claim 14, wherein communicating the proposed reallocation of the remaining spectrum resources further comprises communicating bearer modification proposals based on an outcome of a resource reallocation analysis algorithm so that the network core can evaluate and respond with appropriate bearer update or deletion procedure(s).

17. The non-transitory computer readable storage device of claim 14, wherein the machine comprises an evolved Node B (eNB) arranged to communicate the proposed reallocation of remaining spectrum resources to the network core via a communicatively coupled Mobility Management Entity (MME) with a list of proposed Enhanced Radio Access Bearer (E-RAB) modifications or deletions.

18. The non-transitory computer readable storage device of claim 14, wherein a Mobility Management Entity (MME) communicatively coupled to an eNB translates proposed Enhanced Radio Access Bearer (E-RAB) updates to Evolved Packet System (EPS) bearer resource modifications, and then routes a translated modification message through a serving gateway (S-GW) and a packet data network gateway (P-GW) to a policy and charging control function (PCRF) of the network core, and wherein the PCRF then evaluates proposed modifications and returns bearer update commands based on an eNB proposal to the eNB through the P-GW, S-GW and MME respectively, causing the MME to process the E-RAB modifications as necessary.

19. The non-transitory computer readable storage device of claim 14, wherein the directive to relinquish the acquired LSA spectrum resource comprises LSA band descriptive information comprising a geographic area identifying the LSA spectrum resource to be relinquished.

20. The non-transitory computer readable storage device of claim 14, wherein performing an analysis of optimal spectrum resource reallocation for determining a proposed reallocation of the remaining spectrum resources further comprises executing a vendor specific resource reallocation algorithm.

\* \* \* \* \*